United States Patent

Baur et al.

[11] Patent Number: 5,319,918
[45] Date of Patent: Jun. 14, 1994

[54] METHOD FOR MANUFACTURE OF A HORSESHOE

[76] Inventors: Andreas Baur; Fritz Baur, both of Forstenrieder Allee 197, D-8000 München 71, Fed. Rep. of Germany

[21] Appl. No.: 979,864
[22] PCT Filed: Aug. 14, 1991
[86] PCT No.: PCT/EP91/01550
§ 371 Date: Feb. 25, 1993
§ 102(e) Date: Feb. 25, 1993
[87] PCT Pub. No.: WO92/03770
PCT Pub. Date: Mar. 5, 1992

[30] Foreign Application Priority Data

Aug. 27, 1990 [DE] Fed. Rep. of Germany ....... 4027057

[51] Int. Cl.$^5$ ............................................. B21K 15/02
[52] U.S. Cl. ............................. 59/61; 59/36; 72/7; 364/474.01
[58] Field of Search ............... 59/36, 61, 66; 364/472, 364/474.03, 474.01; 72/7

[56] References Cited

U.S. PATENT DOCUMENTS

| | | |
|---|---|---|
| 3,780,810 | 12/1973 | Ashton ........................... 59/36 |
| 3,797,228 | 3/1974 | Kirkpatrick et al. ............ 59/61 |
| 4,462,377 | 7/1984 | Tanaka et al. ................. 123/571 |
| 4,484,438 | 11/1984 | Griffiths ........................ 59/61 |
| 4,878,541 | 11/1989 | Pedersen ....................... 168/4 |
| 4,918,611 | 4/1990 | Shyu et al. ................. 364/474.08 |
| 4,944,147 | 7/1990 | Finnegan ....................... 59/61 |
| 4,972,323 | 11/1990 | Cauwet ..................... 364/474.29 |

FOREIGN PATENT DOCUMENTS

| | | |
|---|---|---|
| 2549676 | 7/1983 | France . |
| WO88/00793 | 2/1988 | PCT Int'l Appl. . |
| WO08/08666 | 11/1988 | PCT Int'l Appl. . |
| 2067326A | 1/1980 | United Kingdom . |

OTHER PUBLICATIONS

J. Hickman: Der richtige Hufbeschlag, Illustriertes Handbuch für Theorie und Praxis.
Digitalisierung grafischer Vorlagen durch automatische Kurvenabtastung.

Primary Examiner—David Jones
Attorney, Agent, or Firm—Keck, Mahin & Cate

[57] ABSTRACT

A method for the manufacture of a horseshoe is described, which is characterized in that firstly individual hoof dimensions are directly measured on the hoof and taken into account during manufacture in such a way that by an automatic control system a horseshoe is worked from a solid material and is ready for fitting to the hoof without any reworking or adaptation deformation being necessary.

14 Claims, 1 Drawing Sheet

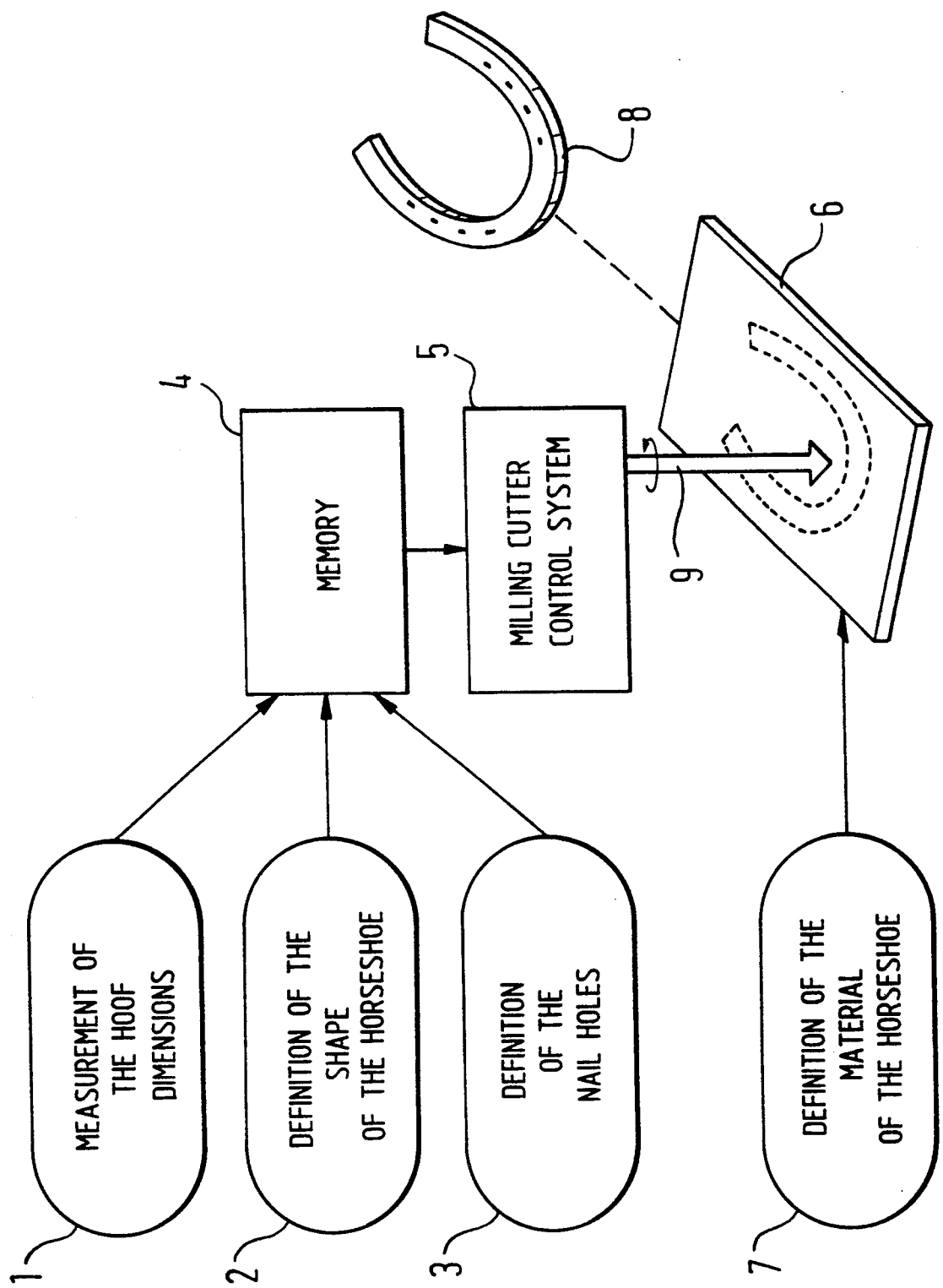

METHOD FOR MANUFACTURE OF A HORSESHOE

The invention relates to a method for the manufacture of a horseshoe.

Factory-made horseshoes and also hand-forged horseshoes are known. Factory horseshoes are neither better, nor more durable than the best hand-forged horseshoes, but have the advantage that a proven model can be copied. They have a uniform shape, a planar support surface and save valuable time on the part of the blacksmith by reducing manual work.

It is known from the textbook by J. Hickmann "Der richtige hufbeschlag", BLV-Verlagsgesellschaft, to manufacture factory horseshoes either by drawing a piece of iron bar or flat steel bar around a block or ingot, or by punching or stamping in a die. A disadvantage of horseshoes manufactured in this way is that the nail holes on each shoe are vertically punched in the same way and size. Vertical nail holes provide the blacksmith with little clearance when driving in the nails. It is therefore necessary in the case of such horseshoes to subsequently make holes manually, which obviously leads to disadvantages. As all the nail holes are at the same distance from the edge of the horseshoe, the advantages of fine and coarse nailing are lost which make it possible to solve the specific problems of certain horses.

As horseshoes constitute a mass produced article, which must be inexpensive, only certain standard horseshoe shapes and sizes can be manufactured.

The tendency is to make horseshoes as light as possible. They must protect the hoof and give it an adequate hold, whilst at the same time being strong enough not to twist, bend or break. Particularly in the case of race horses, it is necessary to use extremely light horseshoes.

In the case of factory horseshoes made from aluminium, the problem arises that aluminium cannot be readily shaped, as is possible with wrought iron shoes. Therefore in the case of factory-made horseshoes, the blacksmith must select from the standard sizes and shapes a shoe which is closest to the shape and size of the hoof which is to be shoed. However, only a relatively limited accuracy of fit is then obtained. It also does not allow adequate account to be taken of the type of horse involved, its size, its weight and what type of work it carries out. Adequate account cannot be taken of the gait and build of the horse. It is scarcely possible to meet the very different requirements made on race, hunting, polo, carriage and riding horses. Even less is it possible to correct faulty hoofs through the shoeing operation. Faulty hoofs are in particular those which are abnormal or deformed due to the hoof position or leg position of the horse. Numerous other influences can also lead to faulty hoofs and this can only be inadequately counteracted by the use of factory-made horseshoes.

The object of the invention is to provide a method for the manufacture of a horseshoe, which enables the latter to be economically made from a particularly lightweight material, which can be adapted in optimum manner to a random hoof if the latter has irregularities.

According to the invention this object is achieved in that on each hoof which is to be shoed, measurement or recording takes place of the hoof dimensions essential for an individually adapted shape of a horseshoe, that a predeterminable horseshoe shape is established from the essential hoof dimensions, whilst taking account of any irregularities present, that from the essential hoof dimensions a number favourable for the physiologically optimum fitting of the horseshoe to the hoof and the corresponding position of the nail holes in the horseshoe are fixed, that the hoof parameters essential for the shape and the nail holes of the horseshoe are fed into a memory of a control means for a manufacturing machine, that the stored hoof parameters are used for guiding the movement of a manufacturing tool, that the desired predetermined horseshoe shape, including the nail holes is worked from a piece of solid material, that the horseshoe is manufactured from a random, predeterminable material, which is suitable for working and that through the method steps the horseshoe is given its final shape ready for fitting, so that it is ready for fitting to the hoof without any reworking or adapting deformation being necessary.

The method according to the invention leads to the essential technical advance, that an extremely good accuracy of fit is still obtained when using a material such as high-strength aluminium, which can virtually not be deformed and if on the other hand a faulty hoof has to be shoed, which has pronounced irregularities. Thus, the invention offers the possibility of manufacturing an individually adapted horseshoe for each hoof in a rational and therefore particularly economic manner.

According to the invention there is a completely free material selection, because it is not necessary to subsequently deform a finished horseshoe in order to adapt it to a specific hoof. According to the invention it is possible e.g. from high-strength light material, which cannot be deformed in practice, to manufacture a horseshoe individually adapted to any random hoof.

When using light materials a considerably weight saving is obtained, which has a favourable effect on the work function of the horse. It is possible to use generally not forgeable materials in the method according to the invention.

According to a preferred embodiment of the method according to the invention, the essential hoof parameters are measured in that the hoof outline is recorded as an outline curve and that the latter is evaluated for guiding the manufacturing tool. Therefore the hoof outline can be relatively easily determined and is also taken into account in a very accurate manner. For example, according to the invention, a writing implement can be moved along the edge of the hoof, so as in this way to record the hoof outline on a drawing substrate. It is then possible to draw in the optimum position of the nail holes. In this way particularly high accuracy can be obtained with very simple means.

Preferably the outline curve is electrooptically scanned and broken down into an adequate number of curve dots, which are fed into a memory, from which can be taken the corresponding curve dot coordinates for guiding the manufacturing tool. This not only makes it possible to predetermine the position of the nail holes, but it is also possible to choose and correspondingly produce the direction thereof.

According to an advantageous further development of the method according to the invention, the basic data required for the manufacture of a particular horseshoe type, such as a smooth stamped, folded, mushroom, web or similar horseshoe are fed beforehand into the memory, that for the manufacture of a desired horseshoe the individual hoof parameters are also supplied to the memory and that from the memory the basic data and the individual horseshoe parameters are supplied to the manufacturing machine control system for guiding the manufacturing tool. According to the invention it is naturally possible to predetermine random further horseshoe types, so that particularly flexible account can be taken of the individual needs of a horse. Thus, the invention leads to the further advantage that damage, weaknesses or deformities of the hoof can be largely compensated by a corresponding shaping of the horseshoe.

If the method according to the invention is to be performed in a particularly simple manner, it is appropriate that, apart from the horseshoe type, at least the thickness and width of the desired horseshoe should be fed into the memory. Without any particular additional expenditure, it is also possible to feed into the memory the number and position of the nail holes. Thus, it is possible to ensure that, whilst taking account of the individual structure of a hoof and also in the case of any damage, a particularly good hold of the horseshoe on the hoof is always ensured.

The method according to the invention can e.g. be performed in such a way in the case of race horses that the horseshoe is made from light metal or alloy, particularly from high-strength aluminum. As a result of the absolute accuracy of fit ensured by the invention, in this way an extremely advantageous horseshoe for a race horse is obtained.

According to a particularly advantageous further development of the present method, the horseshoe is made from a plastics material. This can be very valuable in various applications, e.g. in that there are virtually no hoof bruises, if the horse must run on a hard substrate such as a road.

A particularly advantageous development of the method of the invention provides for the horseshoe to be made from a composite material, which is hard at the points exposed to wear and is soft and elastic in the areas in contact with the hoof. This leads to a particularly durable horseshoe, which also protects the horse's hoof and leads to a minimum deterioration of its natural evolution. Such a horseshoe is also particularly pleasant for a horse to wear.

According to the invention, preferably the desired predetermined shape of the horseshoe, including the nail holes, is milled from a piece of solid material or is worked out with the aid of a laser beam or a water jet.

Particularly advantageously the essential hoof dimensions can be measured in such a way that a video camera is positioned at a predetermined distance from a hoof so that the hoof can be photographed from below and the essential hoof dimensions are fed directly from the video camera into the memory.

This substantially completely eliminates human error. It also leads to the advantage that defects on a hoof are automatically determined in the picture taken by the video camera and can be taken into account when making the horseshoe. If e.g. a hoof is not suitable at certain points for the fixing of a horseshoe, the nail holes can be so positioned that, despite these defects, there is an optimum fitting of the horseshoe to the hoof.

The invention is described in exemplified manner hereinafter relative to the single drawing, which is a diagrammatic block view of the sequence of the method according to the invention. The drawing illustrates a preferred embodiment of the inventive method for the manufacture of a horseshoe.

Block 1 represents the measurement of the hoof dimension. This can take place by placing the hoof on a corresponding substrate, a writing implement is guided round the hoof edge and in this way the outline of the hoof is recorded on a drawing substrate and finally any other desired horseshoe shapes are drawn in.

Then, according to block 2, the horseshoe shape is fixed. It is possible to freely select a horseshoe type, which would appear to be optimum for the hoof in question. The details necessary for the manufacture of such a horseshoe type can have been stored beforehand.

The nail holes are then fixed according to block 3. This can e.g. take place in that on the drawing substrate used for determining the hoof outline are entered the desired nail hole positions. It is also possible to predetermine the direction of the nail holes, because it is not always appropriate to pass the holes vertically through a horseshoe.

The dimensions measured on the hoof and the predetermined horseshoe shape and the fixing of the nail holes are then fed into a memory 4. In the latter said data are available and can then be used for supply to a milling cutter control system 5 enabling the predetermined horseshoe shape to be cut from a piece of solid material 6. The solid material 6 can e.g. be an aluminium plate, which in some cases can have the thickness of the sought horseshoe. Through the control data read out of the memory 4 it is possible by means of the control system 5 to automatically control the diagrammatically represented cutter 9 in such a way that the desired horseshoe shape is cut from the solid material 6. This leads to the horseshoe 8. As the said horseshoe 8 already meets all the individual requirements made by a specific hoof, there is no need for any subsequent working. At the same time the horseshoe 8 has an absolute accuracy of fit for the hoof to which it is to be fitted.

According to block 7 the material for the manufacture of the horseshoe 8 can be selected and established according to the particular requirements.

We claim:

1. A method for manufacturing a horseshoe, comprising:
   measuring dimensions for an individually adapted horseshoe for each hoof;
   defining a shape for the horseshoe (8) according to the measured dimensions;
   using the measured dimensions for determining a physiologically optimum fitting for the horseshoe (8) to the hoof and corresponding positions of nail holes in the horseshoe (8) for fixing the horseshoe to the hoof;
   calculating hoof parameters of shape, number and position of the nail holes of the horseshoe;
   storing the hoof parameters in a memory (4) of a control system (5) for a manufacturing machine;
   using the calculated and stored hoof parameters for guiding movement of a manufacturing-machine tool;
   working a horseshoe shape adapted to the hoof from solid material using the calculated and stored horseshoe parameters, including the positions of the nail holes; and
   fitting the horseshoe to the hoof without reworking being necessary.

2. A method according to claim 1 comprising measuring an outline of the hoof and recording said outline as an outline curve, and using said curve for guiding a manufacturing tool.

3. A method according to claim 2 comprising electro-optically scanning the outline curve and breaking down said curve into a sufficient number of curve dots for feeding into the memory for providing corresponding curve dot coordinates for guiding the manufacturing-machine tool.

4. Method according to claim 1 comprising feeding data for manufacturing a specific horseshoe type, said data being related to a horseshoe selected from smooth punched, folded, mushroom and web horseshoe, into said memory, supplying individual hoof parameters for manufacture of a desired horseshoe to the memory, and from the memory, supplying said basic data and said individual horseshoe parameters to a control system for the manufacturing machine for guiding the manufacturing tool.

5. Method according to claim 1 comprising feeding thickness and width of a desired horseshoe into the memory.

6. A method according to claim 1 comprising feeding number and position of the nail holes into the memory.

7. Method according to claim 1 comprising making the horseshoe from light metal.

8. Method according to claim 7 comprising making the horseshoe from high-strength aluminum.

9. Method according to claim 1 comprising making the horseshoe from a plastic material.

10. Method according to claim 1 comprising making the horseshoe from a composite material comprising hard portions where said horseshoe is exposed to where and soft elastic portions in areas coming into contact with the hoof.

11. Method according to claim 1 comprising cutting said predetermined shape of the horseshoe, including the nail holes, out of a piece of solid material.

12. A method according to claim 1 comprising working said predetermined shape of the horseshoe, including the nail holes, from a piece of solid material, using a laser beam.

13. Method according to claim 1 comprising working said predetermined shape of the horseshoe, including the nail holes, from a piece of solid material, using a water jet.

14. Method according to claim 1 comprising measuring dimensions of the hoof using a video camera positioned at a defined distance from a hoof, wherein said hoof is photographed from below, and said dimensions are fed directly by said video camera into said memory.

* * * * *